United States Patent
Nieuwejaar (10) Patent No.: US 7,945,915 B1
(45) Date of Patent: May 17, 2011

(54) EFFICIENT OPERATING SYSTEM INTERPOSITION MECHANISM

(75) Inventor: Nils A. Nieuwejaar, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1013 days.

(21) Appl. No.: 11/637,986

(22) Filed: Dec. 12, 2006

(51) Int. Cl.
*G06F 9/44* (2006.01)

(52) U.S. Cl. ........ 719/315; 719/312; 719/319; 712/220; 712/228; 712/233

(58) Field of Classification Search .................... 719/319
See application file for complete search history.

(56) References Cited

U.S. PATENT DOCUMENTS

| | | | | |
|---|---|---|---|---|
| 5,900,025 A | * | 5/1999 | Sollars | 712/248 |
| 6,086,623 A | * | 7/2000 | Broome et al. | 703/26 |
| 6,530,017 B1 | * | 3/2003 | Dice et al. | 712/242 |
| 6,944,699 B1 | * | 9/2005 | Bugnion et al. | 710/269 |
| 2007/0143436 A1 | * | 6/2007 | Heffley et al. | 709/213 |

* cited by examiner

*Primary Examiner* — Andy Ho
*Assistant Examiner* — Shih-Wei Kraft
(74) *Attorney, Agent, or Firm* — Marsh Fischmann & Breyfogle LLP; Jonathan A. Szumny; Kent A. Lembke (57) ABSTRACT

Methods and systems for efficiently interpreting operating system service requests on the same register or vector of a processor or CPU where the operating system service requests are initiated from native and non-native applications are provided. More particularly, a switching layer can enable processing of the operating system service requests by routing control of a particular request to an appropriate kernel subsystem or module based on the type of operating system service being requested and the type of application initiating the request. Additionally, the performance impact of the switching layer for native applications is overcome by dynamically reprogramming the processor or CPU on every change of active process so that only foreign applications are subject to the processing requirements of the switching layer.

11 Claims, 5 Drawing Sheets

EFFICIENT OPERATING SYSTEM INTERPOSITION MECHANISM

CROSS REFERENCE TO RELATED APPLICATIONS

The present application is related to U.S. application Ser. No. 11/637,985 entitled "method for Defining Non-Native Operating Environments," filed on Dec. 12, 2006, and incorporated herein by reference. The present application is further related to U.S. application Ser. No. 11/637,989 entitled "System for Defining Non-native Operating Environments," filed on Dec. 12, 2006, and incorporated herein by reference. The present application is further related to U.S. Application Ser. No. 60/874,581, entitled "method and System for Defining Non-Native Operating Environments," filed on Dec. 12, 2006, and incorporated herein by reference.

BACKGROUND

1. Field of the Invention

The invention relates generally to operating system environments, and more particularly, to systems and methods for interpreting requests from foreign and native applications executing within a single native operating environment.

2. Description of the Related Art

Conventionally, the mechanisms by which a computer application requests operating system services are limited, and generally imposed by the underlying system hardware. More particularly, when an application requests an operating system service from an operating system, the application typically issues the request by invoking a special central processing unit (CPU)-specific "trigger instruction." Upon receiving this trigger, the CPU will transfer control from the application to a specific location in the operating system. This location is identified by the operating system by writing the location's address to a special control register in the CPU. This register is typically written to once when the operating system is initially booted, and is never modified again. However, given the limited number of trigger mechanisms available in a processor, it is common for different operating systems to make use of the same triggers. Therefore, if a native operating system attempts to host a non-native application written for different operating system, the native operating system should expect the non-native application to request operating system services using the same mechanisms as those being used by a native application. Interpreting different types of operating system service requests via the same mechanism can impose an unnecessary performance penalty on native applications as well as non-native applications.

In view of the forgoing, there is a need to provide an efficient operating system interposition mechanism for delivering expected operating system services to non-native applications without affecting the performance of native applications.

SUMMARY

In one embodiment, the present invention provides a computer system for processing operating system service requests for multiple different operating system environments. The computer system comprises a native application module located at a user level of the computer system, wherein the native application is written for a native operating system. The computer system also comprises a foreign application module located at a user level of the computer system, wherein the foreign application module is written for an operating system that is different from the native operating system. The computer system further comprises a processor, the processor including a register, wherein the register is dynamically reprogrammed on every change of active process so that if a native application module is active on the processor, a first address is loaded in the register, and if a foreign application module is active on the processor, a second address is loaded in the register.

In another embodiment, the present invention provides a method for enabling a computer system to process operating system service requests for multiple different operating system environments. The method comprises providing a native application module at a user level of the computer system, wherein the native application module is written for a native operating system. The method also comprises providing a foreign application module at the user level of the computer system, wherein the foreign application module is written for an operating system that is different from the native operating system. The method further comprises providing a processor at a hardware level of the computer system, the processor including a control register, and dynamically reprogramming the control register on every change of active process so that if the native application module is active on the processor, a first address is loaded in the register, and if the foreign application module is active on the processor, a second address is loaded in the control register.

In yet another embodiment, the present invention provides a computer-readable medium for directing a computer system to process operating system service requests for multiple different operating system environments. The computer-readable medium comprises instructions for providing a native application module at a user level of the computer system, wherein the native application module is written for a native operating system. The computer-readable medium also comprises instructions for providing a foreign application module at the user level of the computer system, wherein the foreign application module is written for an operating system that is different from the native operating system. The computer-readable medium further comprises instructions for providing a processor at a hardware level of the computer system, the processor including a control register. The computer-readable medium also comprises instructions for dynamically reprogramming the register on every change of active process so that if the native application module is active on the processor, a first address is loaded in the register, and if the foreign application module is active on the processor, a second address is loaded in the register.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION

Executing non-native software applications written for one operating system on another operating system requires providing the services expected by the non-native (i.e. foreign) applications in the native operating system environment. However, the mechanisms by which any application, whether native or non-native, can request operating system services are limited and generally imposed by the underlying computer system hardware. Namely, when an application requests an operating system service from the operating system, the application generally does so through one of the registers or vectors provided by the underlying hardware. It is common for different operating systems to make use of the same hardware registers or vectors. Therefore, when a native operating system attempts to host an application from a foreign operating system environment, the native operating system must necessarily expect the native and non-native applications to request services using the same vectors or registers.

Embodiments of the present invention provide systems and methods for efficiently interpreting operating system service requests on the same register or vector of a processor or CPU where the operating system service requests are initiated from one or more native applications, multiple non-native applications of different types, and one or more non-native applications of the same type. More particularly, according to embodiments of the present invention, interpreting these different types of operating system service requests on the same register or vector of a processor or CPU can require the introduction of a switching layer within the kernel of the native operating system. The switching layer can enable processing of the operating system service requests by routing control of a particular request to an appropriate kernel subsystem or module based on the type of operating system service being requested and the type of application initiating the request. Embodiments of the present invention avoid the performance impact of the switching layer for native applications by dynamically reprogramming the processor or CPU on every change of active process so that only foreign applications are subject to the processing requirements of the switching layer.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. The present invention includes several aspects and is presented below and discussed in connection with the Figures and embodiments.

Figure 1:
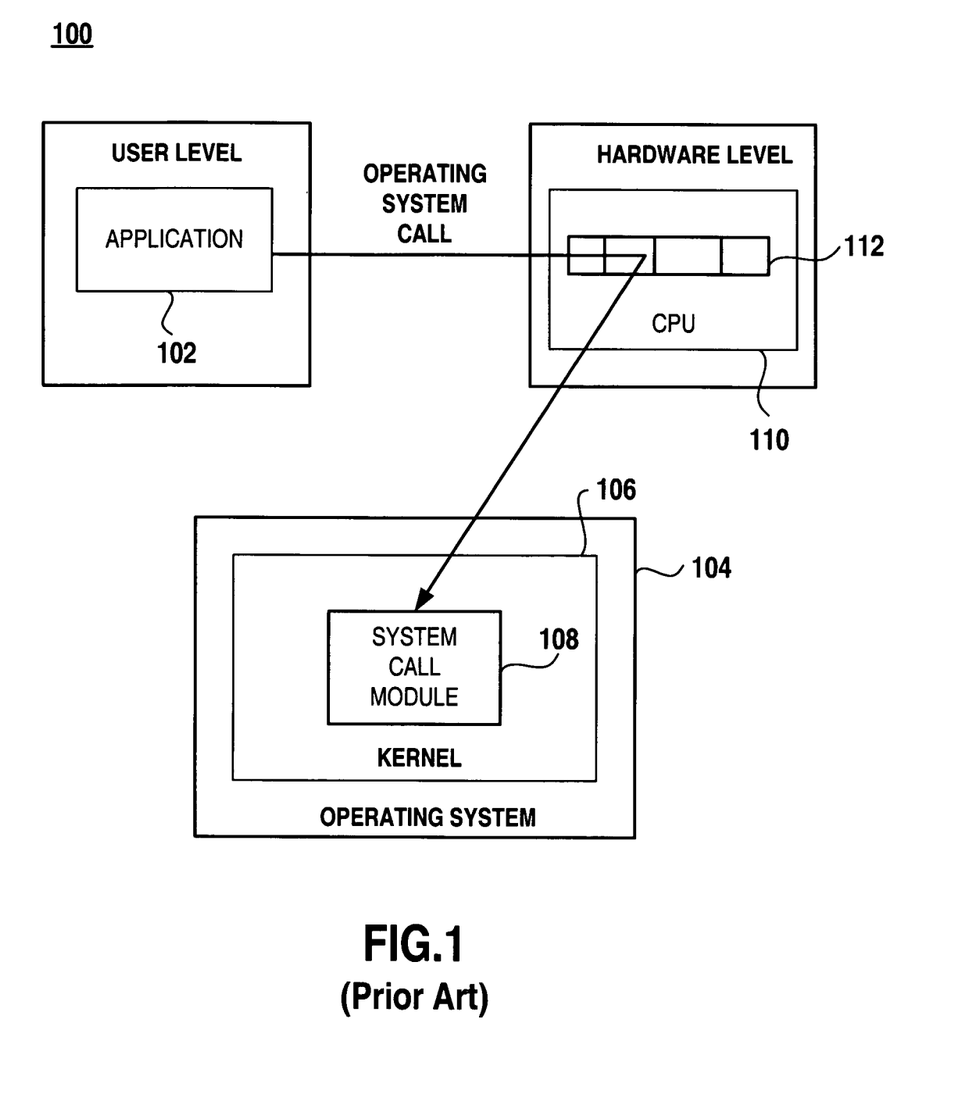
FIG. 1 is a block illustration of a conventional mechanism by which an application requests operating system services.

In FIG. 1, for purposes of background, a computer system 100 is illustrated that provides a standard mechanism by which an application 102 requests operating system services from an operating system environment 104. As shown in FIG. 1, the application 102 is written for the operating system environment 104. Included in a kernel 106 of the operating system environment 104 is a system call module 108 that is capable of processing an operating system service request initiated from the application 102, according to specifications defining the operating system environment 104. Included in the computer system 100 is a processor or CPU 110 that includes a control register 112. According to one embodiment of the present invention, the control register 112 is a special register used to configure the CPU 110. More particularly, the control register 112 is used to indicate the location to which a CPU 110 should jump upon receiving a special trigger instruction. This control register 112 can be initialized by the operating system by writing an address to a specific control register of a processor or by programming a table of control vectors of a processor at the time the operating system first boots up. During the "boot up" of the operating system environment 104, the kernel 106 loads the control register 112 with an address that points to the system call module 108 in the kernel 106. Later, when the application 102 requests an operating system service at 114, the application 102 does so by issuing a special trigger instruction that causes the CPU 110 to refer to the value written to the control register 112 and to transfer control to the system call module 108 of the kernel 106. The invocation of the system call module 108 then causes the operating system service call requested by the application 102 to be processed.

Figure 2:
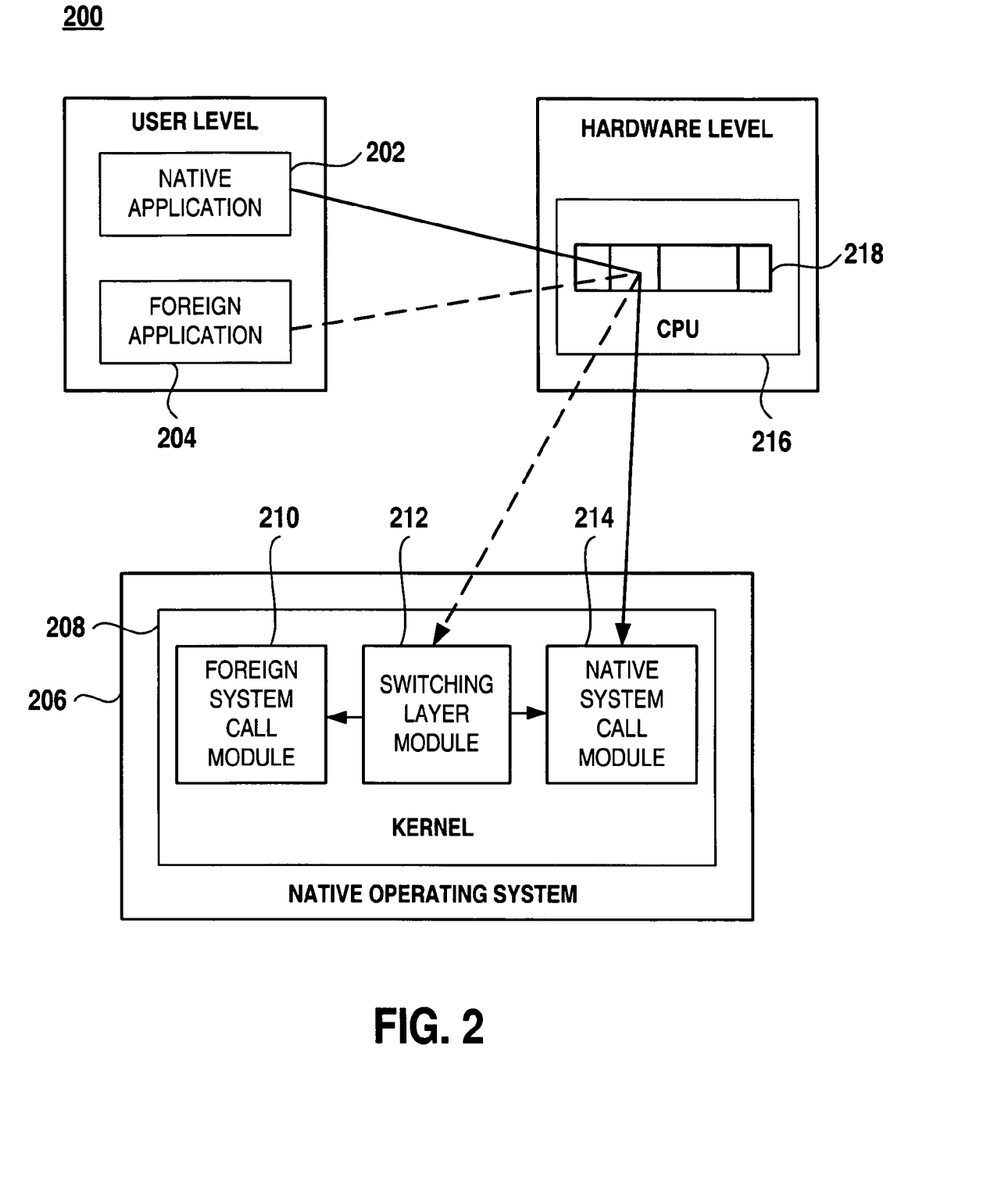
FIG. 2 is a block illustration of a mechanism by which native and foreign applications can request operating system services, in accordance with an embodiment of the present invention.

In FIG. 2, according to one embodiment of the present invention, a computer system 200 is illustrated that provides a mechanism by which non-native applications running on a native operating system can request operating system services using the same registers or vectors as those used by native applications without affecting the performance of the native applications. The computer system 200 includes a native application 202 and a foreign application 204 each located at a user level of the system 200, where each application 202, 204 is capable of executing on a native operating system environment 206. The native operating system environment 206 can be a product or application sold under the trademark LINUX™, SOLARIS™, UNIX™ WINDOWS™, MACOS™, or any other acceptable operating system environment. The foreign or non-native application 204 is written for an operating system environment that is different from the native operating system environment 206. According to embodiments of the present invention, the foreign application 204 can be a product or application sold under the trademark LINUX™, SOLARIS™, UNIX™, WINDOWS™, MACOS™, or any other application written for a particular operating system environment. The native application 202, on the other hand, is written for the operating system environment 206. The native application 202 can be a Linux™-based, a Solaris™-based, a UNJX™-based, a Windows™-based, a MacOS™-based application, or any other application written for a particular operating system environment.

Also included is a processor or central processing unit (CPU) 216 located at a hardware level of the system 200. There is typically only one application that can run on the CPU 216 at any point in time and the kernel 208 determines which application is actively running at that point in time. In other words, the kernel 208 switches between application processes 202, 204 and determines which application 202, 204 is currently active on the CPU 216. The CPU (or processor) 216 includes a control register 218 that is used to indicate a location to which the CPU 216 should jump upon receiving a special trigger instruction issued from the application 202, 204, namely the location (address) of a kernel module that is used for processing an operating system service request. However, unlike FIG. 1, according to one embodiment of the present invention, the CPU 216 is dynamically reprogrammed on every change of active process so that when the native application 202 is active on the CPU 216 and the native application 202 initiates an operating system service request, the address loaded in the register 218 points to a native system call module 214 of the kernel 208. Likewise, when the foreign application 204 is active on the CPU 216 and the foreign application 204 initiates an operating system service request, the address loaded in the register 218a points to a switching layer module 212 of the kernel 208. After the address is loaded in the control register 218, when a native application 202 or a foreign application 204 requests an operating system service, the application 202,204 does so by issuing a special trigger instruction, which causes control to be transferred to either the native system call module 214 or the switching layer module 212 of the kernel 208. According to one embodiment of the present invention, operating system service requests issued from different foreign application types 204 can go through a single common switching mechanism. According to another embodiment of the present invention, different switching mechanisms can be implemented for each foreign application 204 type. In the latter case, each foreign application 204 type can have its own corresponding control register 218 address. In either case, by transferring control to the switching layer module 212 only when a foreign application 204 requests an operating system service, the performance impact of providing a switching layer within the native operating system environment 206 is avoided for native applications 202. And only a slight performance penalty is imposed on foreign applications.

More particularly, according to one embodiment of the present invention, included in the kernel 208 are a foreign system call module 210, the switching layer module 212, and the native system call module 214. The foreign system call module 210 is only capable of processing operating system service calls initiated from foreign applications 204. However, because the operating system environment 206 may support some subset of services provided by the operating system the foreign application 204 is written for, in a manner the foreign application 204 expects, the native system call module 214 is capable of processing some operating system service calls initiated from foreign applications 204 and all operating system service calls from native applications 202.

In FIG. 2, the switching layer module 212, on the other hand, is a special purpose module that provides a switching layer within the native operating system environment 206. The switching layer module 212, enables the correct interpretation of an operating system service request from foreign applications 204 by routing control to either the foreign system call module 210 or the native system call module 214, depending upon certain criteria provided to the switching layer module 212 at the time the switching layer module 212 is entered. In one embodiment of the present invention, this criteria includes the type of application requesting the operating system service and the specific service being requested. In one embodiment of the present invention, the type of application requesting the service can include, but is not limited to, a product or application sold under the trademark LINUX™, SOLARIS™, UNIX™, WINDOWS™, MACOS™. In one embodiment of the present invention, the application type is determined when the application 202,204 is first loaded into memory by the operating system 206, using heuristics about the structure and contents of the file containing the application 202,204. After loading the application 202,204 into memory, the operating system 206 stores the application's type in an internal data structure that can be accessed easily and efficiently.

Regarding identifying the specific service being requested, operating system services are typically identified by some integer number that normally ranges between zero and two-hundred-seventy. Although most operating systems use numbers within the same range to represent their respective services, the specific mapping of numbers to services varies between operating systems. Therefore, in one embodiment of the present invention, service numbers associated with a particular foreign operating system type can be remapped to avoid any confusion with identifiers used by the native operating system. In other words, in one embodiment, each service identifier number can be remapped to that number plus some predetermined constant so that the result is some number outside the normal range of the service numbers used by the native operating system. For example, a Linux™ service identified by the number two becomes one-thousand-two by adding one-thousand; a service identified by the number three becomes one-thousand-three, and so on. However, other implementations for remapping service identifiers can be used including but not limited to multiplying a service number by some predetermined constant. If the type of application initiating the service request is the foreign application 204 and the service identifier corresponding to the request is outside the normal range, the switching layer module invokes the foreign system call module 210 because the foreign application is requesting a service that is uniquely handled by the operating system the foreign application 204 is written for. And if the type of application initiating the service request is the foreign application 204 and the service identifier corresponding to the request is within the normal range, the native system call module 214 is invoked since the foreign application is requesting a service that can be handled by the native operating system environment 206.

Figure 3:
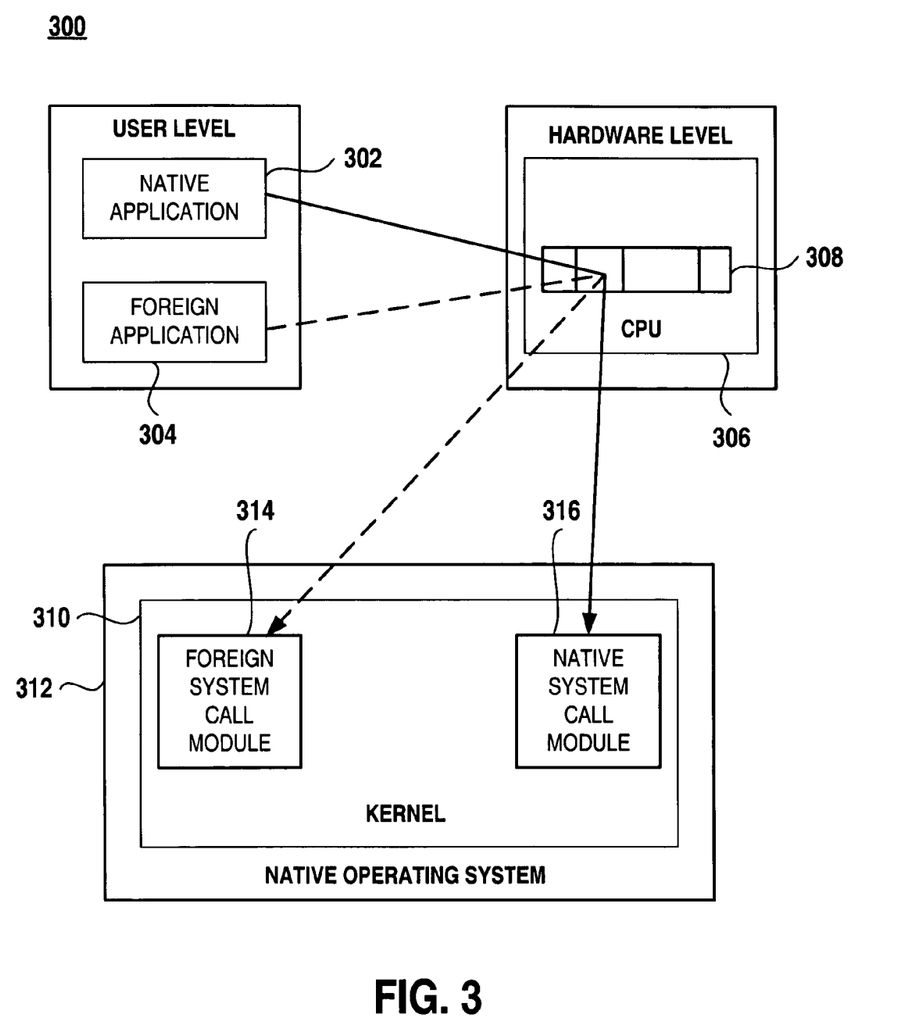
FIG. 3 is a block illustration of an alternate mechanism by which native and foreign applications can request operating system services, in accordance with an embodiment of the present invention.

In FIG. 3, according to an alternate embodiment of the present invention, a system 300 that provides a mechanism by which non-native applications running on a native operating system can request operating system services using the same registers or vectors as those used by native applications without affecting the performance of the native applications. Similar to the system illustrated in FIG. 2, the system 300 includes a native application 302 and a foreign application 304 located at a user level. The system 300 further includes a processor or CPU 306 located a hardware level. The CPU 306 includes a special register 308 similar to the registers illustrated in FIG. 2. However, unlike the system illustrated in FIG. 2, a kernel 310 of the operating system environment 312 includes a foreign system call module 314 and a native system call module 316. The switching layer included in the FIG. 2 system is eliminated because the foreign application 304 is capable of having all of its operating system service requests processed by the foreign system call module 314. In particular, the CPU 306 is dynamically reprogrammed on every change of active process so that when the native application 302 is active on the CPU 306 and the native application 302 initiates an operating system service request, the address loaded in the register 308 points to the native system call module 316 of the kernel 208. And, when the foreign application 304 is active on the CPU 306 and the foreign application 304 initiates an operating system service request, the address loaded in the register 308 points to the foreign system call module 314.

In view of the discussion above, it should be apparent that the embodiments of the present invention provide a capability to interpose on the mechanisms by which an application requests operating system services in a manner that delivers expected services to non-native applications without affecting the performance of native applications. In particular by providing a switching layer in a native operating system environment and dynamically reprogramming hardware on every change of active process, only non-native applications are subject to the performance impacts of the switching layer.

Figure 4A:
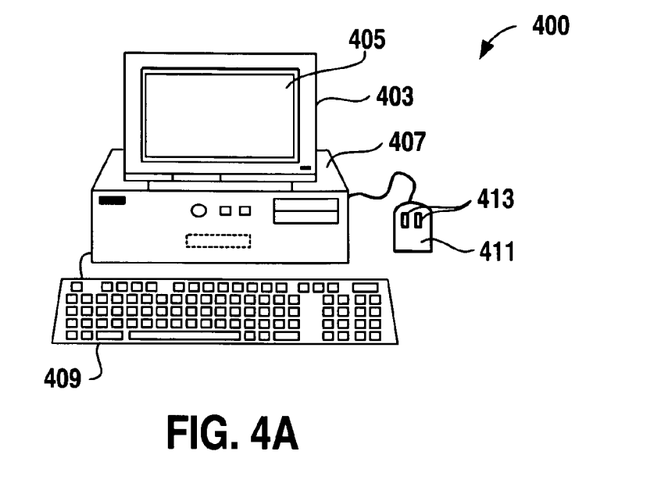
FIG. 4A is a generalized diagram of a typical computer system suitable for use with the present invention.

In FIG. 4A, is an illustration of an embodiment of an exemplary computer system 400 suitable for use with the present invention including display 403 having display screen 405. Cabinet 407 houses standard computer components (not shown) such as a disk drive, CDROM drive, display adapter, network card, random access memory (RAM), central processing unit (CPU), and other components, subsystems and devices. User input devices such as a mouse 411 having buttons 413, and keyboard 409 are shown.

Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

Figure 4B:
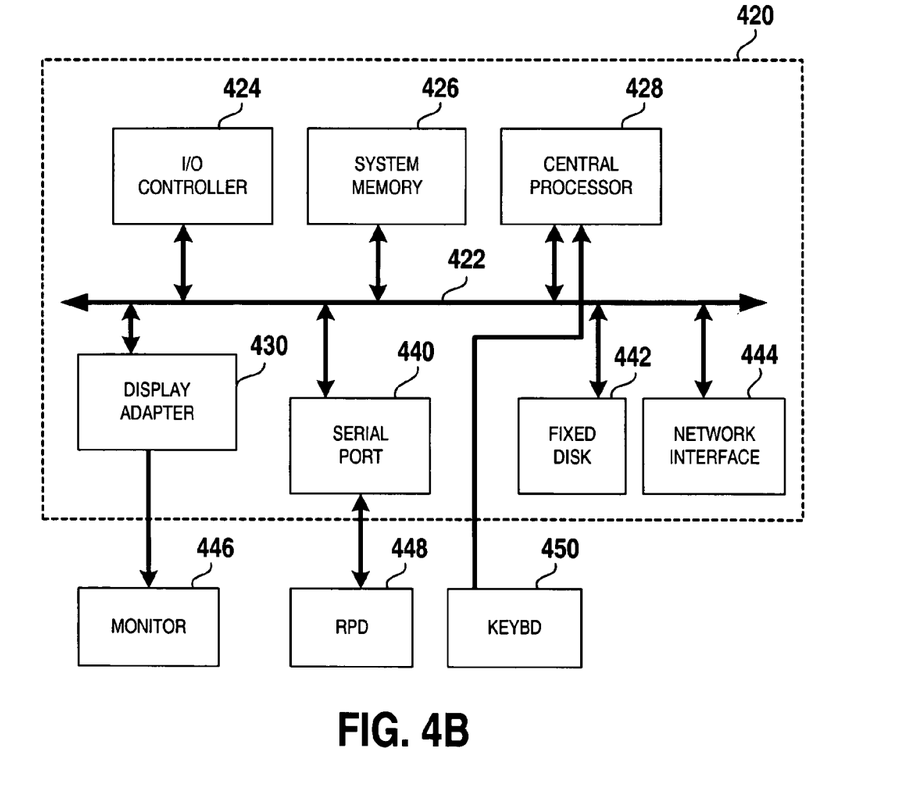
FIG. 4B shows subsystems in the typical computer system of FIG. 4A.

FIG. 4B illustrates subsystems that might typically be found in a computer such as computer 400. In FIG. 4B, subsystems within box 420 are directly interfaced to internal bus 422. Such subsystems typically are contained within the computer system such as within cabinet 407 of FIG. 4A. Subsystems include input/output (I/O) controller 424, System Random Access Memory 9RAM) 426, Central Processing Unit (CPU) 428, Display Adapter 430, Serial Port 440, Fixed Disk 442 and Network Interface Adapter 444. The use of bus 422 allows each of the subsystems to transfer data among the subsystems and, most importantly, with the CPU. External devices can communicate with the CPU or other subsystems via the bus 422 by interfacing with a subsystem on the bus. Monitor 446 connects to the bus through Display Adapter 430. A relative pointing device (RPD) 448 such as a mouse connects through Serial Port 440. Some devices such as a Keyboard 450 can communicate with the CPU by direct means without using the main data bus as, for example, via an interrupt controller and associated registers (not shown).

As with the external physical configuration shown in FIG. 4A, many subsystem configurations are possible. FIG. 4B is illustrative of but one suitable configuration. Subsystems, components or devices other than those shown in FIG. 4B can be added. A suitable computer system can be achieved without using all of the subsystems shown in FIG. 4B. For example, a standalone computer need not be coupled to a network so Network Interface 444 would not be required. Other subsystems such as a CDROM drive, graphics accelerator, etc. can be included in the configuration without affecting the performance of the system of the present invention.

Figure 4C:
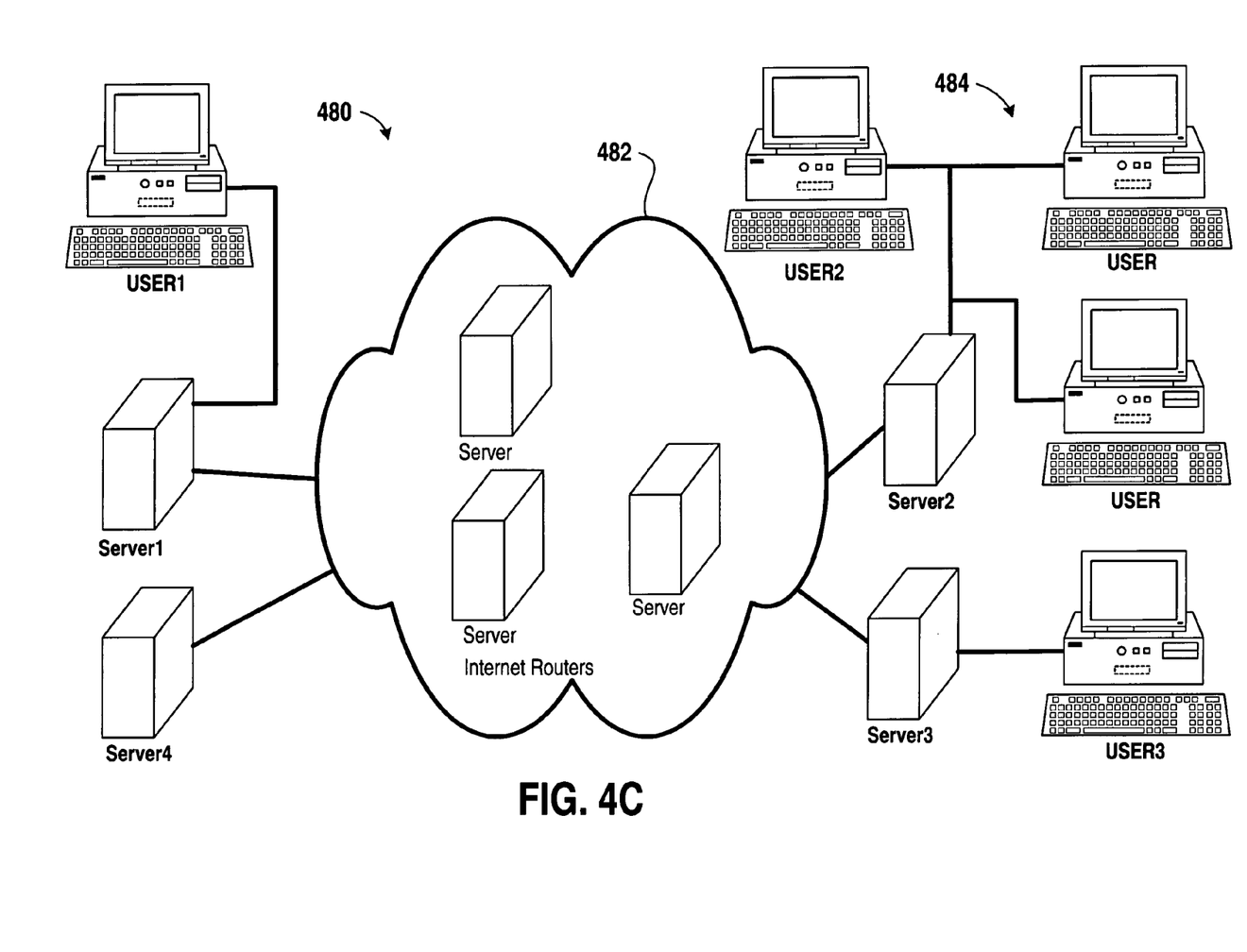
FIG. 4C is a generalized diagram of a typical network suitable for use with the present invention.

FIG. 4C is a generalized diagram of a typical network. In FIG. 4C, the network system 480 includes several local networks coupled to the Internet. Although specific network protocols, physical layers, topologies, and other network properties are presented herein, embodiments of the present invention are suitable for use with any network.

In FIG. 4C, computer USER1 is connected to Server1. This connection can be by a network such as Ethernet, Asynchronous Transfer Mode, IEEE standard 1553 bus, modem connection, Universal Serial Bus, etc. The communication link need not be wire but can be infrared, radio wave transmission, etc. Server1 is coupled to the Internet. The Internet is shown symbolically as a collection of sever routers 482. Note that the use of the Internet for distribution or communication of information is not strictly necessary to practice the present invention but is merely used to illustrate embodiments, above. Further, the use of server computers and the designation of server and client machines are not critical to an implementation of the present invention. USER1 Computer can be connected directly to the Internet. Server1's connection to the Internet is typically by a relatively high bandwidth transmission medium such as a T1 or T3 line.

Similarly, other computers at 484 are shown utilizing a local network at a different location from USER1 computer. The computers at 484 are couple to the Internet via Server2. USER3 and Server3 represent yet a third installation.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically though of as client machines because they are primarily used to obtain information from the Internet for a user operating the machine. Depending on the specific software executing at any point in time on these machines, the machine may actually be performing the role of a client or server, as the need may be. For example, a user's desktop computer can provide information to another desktop computer. Or a server may directly communicate with another server computer. Sometimes this characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart phone, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (110) device, the computer would have suitable instructions for allowing a user to input or output (e.g., present) program code and/or data information respectively in accordance with the embodiments of the present invention.

A "computer-readable medium" or "computer-readable media" for purposes of embodiments of the present invention may be any medium that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for synchronously presenting multiple video program ID streams, such as on a display screen, or for providing for input or presenting in accordance with various embodiments of the present invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer system for processing operating system service requests for multiple different operating system environments, comprising:
   a native application module located at a user level of the computer system, wherein the native application module is written for a native operating system;
   a foreign application module located at a user level of the computer system, wherein the foreign application module is written for an operating system that is different from the native operating system;
   a processor, the processor including a hardware control register, wherein the hardware control register is dynamically reprogrammed on every change of active process so that if the native application module is active on the processor, a first address is loaded in the hardware control register, and if the foreign application module is active on the processor, a second address is loaded in the hardware control register; wherein service requests issued by the native and foreign application modules are respectively processed via the first and second addresses in the hardware control register; and
   a kernel, the kernel including:
      a native call module, wherein the first address corresponds to the native call module, and wherein the native call module is capable of processing a service request from the native application module;
      a foreign call module, wherein the foreign call module is capable of processing a service request from the foreign application module; and
      a switching layer module, wherein the second address corresponds to the switching layer module, and wherein the switching layer module is capable of invoking the foreign call module or the native call module;
      wherein when a service request from the native application module issues, the processor jumps to the first address, thereby invoking the native call module;
      wherein when a service request from the foreign application module issues, the processor jumps to the second address, thereby invoking the switching layer module; and
      wherein the switching layer module invokes the foreign call module if an identifier corresponding to the service request from the foreign application module is outside of a range utilized by the native operating system.

2. The system as recited in claim 1, wherein the identifier is an integer number equal to a constant integer number plus an integer number corresponding to a service provided by the operating system, the service corresponding to the service requested from the foreign application module.

3. The system as recited in claim 2, wherein the constant integer number is selected so that the identifier is outside the range utilized by the native operating system.

4. The system as recited in claim 1, wherein the switching layer module invokes the native call module if an identifier corresponding to the service request from the foreign application module is within of a range utilized by the native operating system.

5. In a computer system having a native application module written for a native operating system at a user level of the computer system, a foreign application module written for an operating system that is different from the native operating system at the user level of the computer system, and a processor including a control register at a hardware level of the computer system, a method for enabling the computer system to process operating system service requests for multiple different operating system environments, the method comprising:
   dynamically reprogramming the control register on every change of active process, the dynamic reprogramming comprising:
      loading a first address into the control register when the native application module is active on the processor; and
      loading a second address into the control register when the foreign application module is active on the processor; and
   issuing, by the native or foreign application module, a service request; and
   transferring control of the native or foreign application modules to a kernel of the native operating system, the kernel including:

a native call module that processes operating system service requests from either the native or foreign application modules, wherein the first address corresponds to the native call module, and wherein the processor jumps to the first address in response to the issuing, thereby invoking the native call module;

a foreign call module that processes operating system service requests from the foreign application module; and a switching layer module that invokes either the native or foreign application module, wherein the second address corresponds to the switching layer module, and wherein the processor jumps to the second address in response to the issuing, thereby invoking the switching layer module.

6. The method as recited in claim 5, wherein invoking the switching layer module comprises:

invoking the foreign call module if an identifier corresponding to the service request from the foreign application module is outside of a range utilized by the native operating system.

7. The method as recited in claim 5, wherein invoking the switching layer module comprises:

invoking the native call module if an identifier corresponding to the service request from the foreign application is within a range utilized by the native operating system.

8. The method as recited in claim 5, wherein the jumping does not include invoking the switching layer module.

9. A computer system for use in processing service requests for multiple different operating system environments, comprising:

a native operating system;

a native application module that is written for the native operating system;

a foreign application module that is written for a foreign operating system;

a processor that receives trigger instructions from the native and foreign application modules, the trigger instructions being associated with operating system service requests, wherein the processor comprises a control register that is dynamically reprogrammed on every change of active process, wherein a first address is loaded in the control register when the native application module is active on the processor and wherein a second address is loaded in the control register when the foreign application module is active on the processor; and a kernel located within the native operating system, the kernel comprising:

a native call module that processes service requests from the native and foreign application modules, wherein the first address corresponds to the native call module, and wherein when trigger instructions issue from the native application module, the processor jumps to the first address, thereby invoking the native call module;

a foreign call module that processes service requests from the first foreign application module; and a switching layer module that invokes the native and foreign call modules, wherein when trigger instructions issue from the foreign application module, the processor jumps to the second address, thereby invoking the first switching layer module or the foreign call module.

10. The system as recited in claim 9, wherein the second address corresponds to the switching layer module.

11. The system as recited in claim 9, wherein the switching layer module invokes the foreign call module if an identifier corresponding to the service request from the foreign application module is outside of a range utilized by the native operating system.

* * * * *